(12) United States Patent
Jung et al.

(10) Patent No.: US 7,659,646 B2
(45) Date of Patent: Feb. 9, 2010

(54) OUTER ROTOR SUPERCONDUCTOR JOURNAL BEARING

(75) Inventors: Se Yong Jung, Daejeon (KR); Young Hee Han, Daejeon (KR); Jeong Phil Lee, Daejeon (KR); Tae Hyun Sung, Daejeon (KR); Byung Jun Park, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 177 days.

(21) Appl. No.: 11/978,749

(22) Filed: Oct. 30, 2007

(65) Prior Publication Data

US 2009/0088324 A1    Apr. 2, 2009

(30) Foreign Application Priority Data

Sep. 28, 2007    (KR) .................. 10-2007-0097850

(51) Int. Cl.
*H02K 7/08*    (2006.01)
*H02K 7/09*    (2006.01)
*H02K 9/00*    (2006.01)

(52) U.S. Cl. ..................... 310/52; 310/90; 310/90.5
(58) Field of Classification Search .......... 310/52, 310/90.5, 90; *H02K 7/08, 7/09, 9/00*
See application file for complete search history.

(56) References Cited

U.S. PATENT DOCUMENTS

| | | | | |
|---|---|---|---|---|
| 5,313,130 A | * | 5/1994 | Shibayama et al. | ........ 310/90.5 |
| 5,325,002 A | * | 6/1994 | Rabinowitz et al. | ......... 505/166 |
| 5,330,967 A | * | 7/1994 | Takahata et al. | ............ 505/166 |
| 5,438,038 A | * | 8/1995 | Takahata et al. | ........... 310/90.5 |
| 5,525,849 A | * | 6/1996 | Ito et al. | ..................... 310/90.5 |
| 5,633,548 A | * | 5/1997 | Takahata et al. | ........... 310/90.5 |
| 5,719,455 A | * | 2/1998 | Higasa et al. | ............... 310/90.5 |
| 5,739,606 A | * | 4/1998 | Takahata et al. | ........... 310/90.5 |
| 5,763,971 A | * | 6/1998 | Takahata et al. | ........... 310/90.5 |
| 5,925,956 A | * | 7/1999 | Ohzeki | ...................... 310/90.5 |
| 7,466,051 B2 | * | 12/2008 | Miya et al. | ................. 310/90.5 |
| 2006/0103249 A1 | * | 5/2006 | Miya et al. | ................. 310/90.5 |

* cited by examiner

*Primary Examiner*—Quyen Leung
*Assistant Examiner*—John K Kim
(74) *Attorney, Agent, or Firm*—IPHorgan Ltd.

(57) ABSTRACT

An outer rotor superconductor journal bearing that comprising modules and including an outer rotor superconductor journal bearing that cools a superconductor that is mechanically fixed to a module below a critical temperature, attains a strong magnetic fixing force in an axial direction and a radial direction, prevents the superconductor from being damaged due to a different thermal expansion between the superconductor and a cryostat when cooled, and is easier for assembling and repair and maintenance. Preferably, the outer rotor superconductor journal bearing includes a rotor in which a solid of revolution magnet is magnetized in an axis direction in an inner portion of an inner circumference thereof; and a stator comprising a cryostat in the shape of a cylinder in which a superconductor that is tightly adhered to an inner circumference of the rotor is mounted in an outer circumference of the cryostat.

4 Claims, 3 Drawing Sheets

OUTER ROTOR SUPERCONDUCTOR JOURNAL BEARING

CROSS-REFERENCE TO RELATED APPLICATIONS

This application claims priority to and the benefit of Korean Patent Application No. 10-2007-0097850, filed on Sep. 28, 2007, the entire content of which is incorporated herein by reference.

BACKGROUND OF THE INVENTION

1. Field of the Invention

The present invention relates to an outer rotor superconductor journal bearing, and more particularly, to an outer rotor superconductor journal bearing capable of cooling a superconductor that is mechanically fixed to a module below a critical temperature.

2. Description of the Related Art

Generally, it is important that a journal bearing used for a rotation device can minimize a contact friction, reduce an energy loss, and bear a heavy load of solid of revolution caused by gravity or the like.

To meet the above requirement, a non-contact journal bearing has been developed. The non-contact journal bearing, which is a substitution of a contact bearing such as a ball bearing or a fluid journal bearing for fixing solid of rotation by contacting, floats the solid of revolution, and achieves revolution without a friction using an attractive force and repulsive force of a permanent magnet or electromagnet. However, the non-contact journal bearing needs an additional active control device for fixing an axis, which causes complexity of and increases costs.

Recently, owing to the development of a superconductor, a non-contact superconductor journal bearing for fixing the solid of revolution with respect to an axis direction and a radius direction without an additional active control by using properties of strongly repulsing a magnetic flux of the superconductor and fixing the injected magnetic flux has been developed.

In such an inner rotor superconductor journal bearing, a magnet ring of the rotor and the superconductor of a stator are spaced apart from each other by a predetermined gap due to a reinforcing member used to reinforce a magnet in an external circumference of the rotor, which deteriorates a floating capability. Furthermore, the superconductor is fixed inside a cryostat in order to cool the superconductor, which increases the space between the magnet ring of the rotor and the superconductor of the stator due to a wall of the cryostat.

Therefore, in order to minimize the space between the magnet ring of the rotor and the superconductor of the stator, an attempt is being made that an outer rotor superconductor journal bearing is used to remove the reinforcing member between the magnet ring of the rotor and the superconductor of the stator, move the superconductor outside the cryostat, cool the superconductor by conductive cooling, and enhance a magnetic fixing force of the bearing.

However, when the superconductor is permanently fixed to the cryostat during a process of manufacturing the conventional outer rotor superconductor journal bearing, the superconductor is damaged due to a different thermal expansion, the outer rotor superconductor journal bearing is in a large scale, causing difficulties when assembled and dissembled, and the permanently fixed superconductor makes it impossible to partially repair and replace the bearing.

SUMMARY OF THE INVENTION

The present invention provides an outer rotor superconductor journal bearing that fixes mechanically and stably a superconductor thereof, effectively cools the superconductor by conductive cooling, minimizes a space between a magnet ring of the rotor and a superconductor of a stator, enhances a fixing force in an axis direction and a radius direction, prevents the superconductor from being damaged due to a different thermal expansion between the superconductor and a cryostat when cooled, and constitutes a module easier for assembling and repair and maintenance.

According to an aspect of the present invention, there is provided an outer rotor superconductor journal bearing comprising: a rotor in which a solid of revolution magnet is magnetized in an axis direction in an inner portion of an inner circumference thereof; and a stator constituting a cryostat in the shape of a cylinder in which a superconductor that is tightly attracted by magnetic force to an inner circumference of the rotor is mounted in an outer circumference of the cryostat.

The cryostat may comprise the superconductor in any one of the sides of the rounded outer circumference thereof, a module base in the shape of a base in which the superconductor is mounted, and a fixing plate supporting the upper and lower surfaces of the superconductor and disposed entirely in the shape of a ring so that the superconductors are spaced apart from each other by a predetermined gap between the upper and lower surfaces of the superconductors.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF PREFERRED EMBODIMENTS

Hereinafter, embodiments of the present invention will be described with reference to the accompanying drawings.

Figure 1:
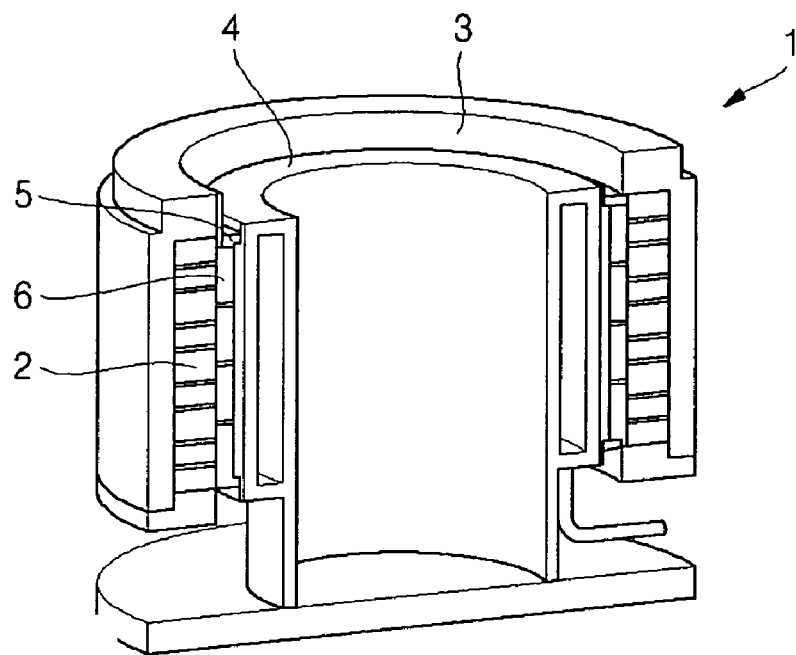
FIG. 1 is a perspective cross-sectional view illustrating an outer rotor superconductor journal bearing according to an embodiment of the present invention.
Figure 2:
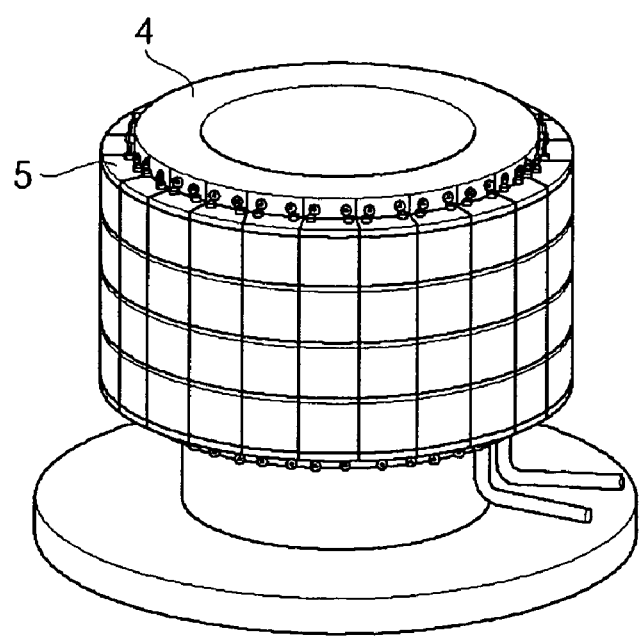
FIG. 2 is a perspective view illustrating a stator according to an embodiment of the present invention.
Figure 3:
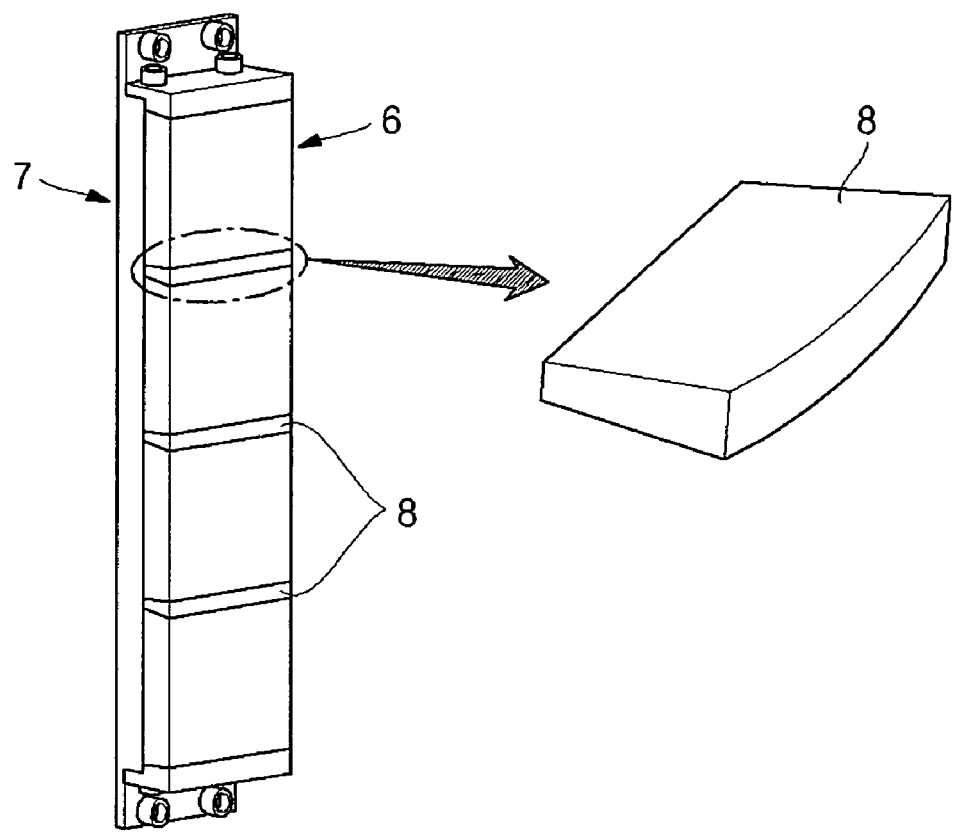
FIG. 3 is a perspective view illustrating a module constituting a stator according to an embodiment of the present invention, including as breakaway detail thereof.

FIG. 1 is a perspective, cross-sectional view illustrating an outer rotor superconductor journal bearing according to an embodiment of the present invention. FIG. 2 is a perspective view illustrating a stator according to an embodiment of the present invention. FIG. 3 is a perspective view illustrating a module constituting a stator according to an embodiment of the present invention, and includes a breakaway detail thereof.

Figure 4:
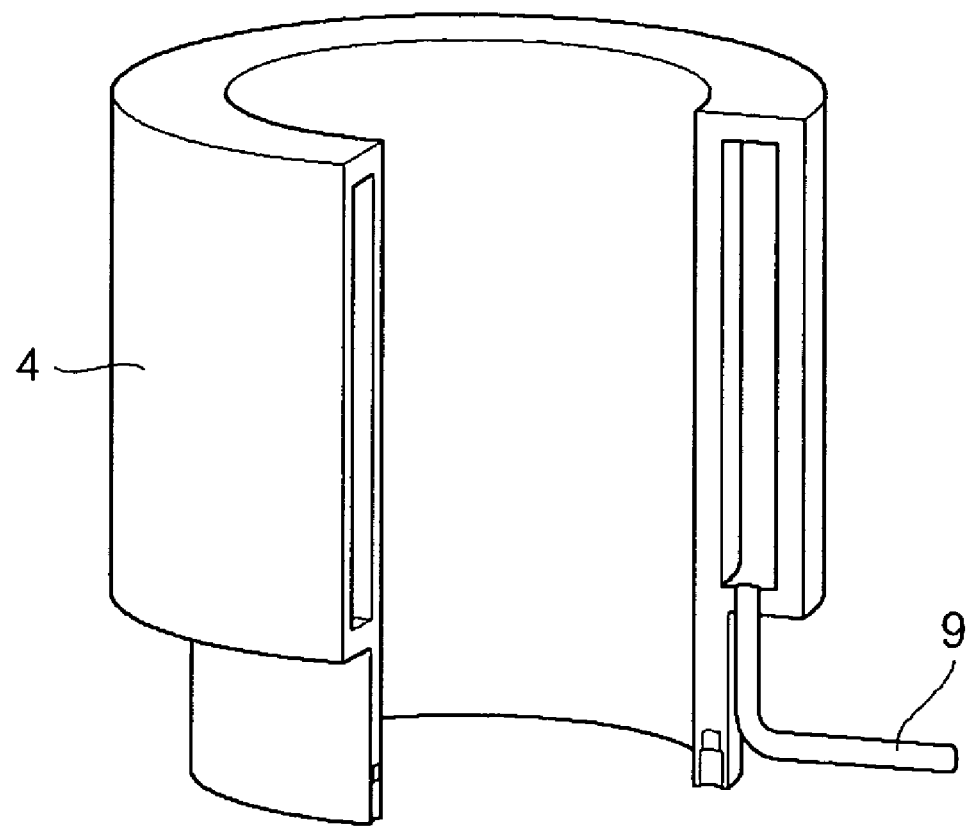
FIG. 4 is a perspective view, in partial cutaway, illustrating a cryostat on which a module is mounted according to an embodiment of the present invention.

FIG. 4 is a partially cutaway, perspective view illustrating a cryostat on which a module is mounted according to an embodiment of the present invention.

Referring to FIG. 1, the outer rotor superconductor journal bearing comprises a rotor 1 and a stator 3. A solid of revolution magnet 2 is magnetized in an axis direction in the shape of a ring in an inner portion of an inner circumference of the rotor 1.

Referring to FIG. 2, the stator 3 constitutes a cryostat 4 in the shape of a round cylinder in which a plurality of modules 5 are mounted.

The cryostat 4 is surrounded by each of the modules 5 in which a plurality of superconductors 6 in the shape of a hexahedron are repetitively arranged.

In order to minimize the space between the solid of revolution magnet 2 of the rotor 1 and the superconductor 6 of the stator 3, maximize an effective area, and enhance a floating capability, the surface of the stator 3 is round in the shape of a regular circle having a revolution axis (not shown) centered, so that the fixed modules 5 are rounded and arranged.

Referring to FIG. 3, each module 5 comprises the superconductor 6 in the shape of a hexahedron, a module base 7 in the shape of a base in which the superconductor 6 is mounted, and a fixing plate 8 that supports the upper and lower surfaces of the superconductor 6 and is disposed entirely in the shape of a ring so that the superconductors 6 are spaced apart from each other by a predetermined gap between the upper and lower surfaces thereof.

At this time, since the surface of the superconductors 6 facing the solid of revolution magnet 2 is rounded, a space between the superconductors 6 and the solid of revolution magnet 2 is minimized and thus an effective area is maximized.

Meanwhile, the upper and lower surfaces of the superconductors 6 are in the shape of an upward inclined taper from a front portion to a rear portion, and are fixed in an axial direction and a radial direction by the fixing plate 8.

Simultaneously, the fixing plate 8 is also in the shape of an upward inclined taper from a front portion to a rear portion in order to correspond to the upper and lower surfaces of the superconductors 8, and is firmly fixed to the module base 7 so that the superconductors 8 can be fixed in the axis direction and the radius direction.

Meanwhile, since the surface of the fixing plate 8 that contacts the superconductors 6 is coated with a material having a good thermal conductivity, the upper and lower surfaces of the superconductors 8 may be cooled by conductivity.

An inner material of the fixing plate 8 is weaker than the superconductors 6 in terms of the intensity so that the superconductors 6 may be prevented from being damaged by cooling contraction of the modules 5.

Referring to FIG. 4, the surface shape of the cryostat 4 in which the modules 5 are mounted corresponds to the surface shape of the module base 7 and both are adhered to each other, thereby maximizing an area in which heat is conducted when the modules 5 are coupled to the surface of the cryostat 4.

Further, a chamber 10 is formed inside the cryostat 4 to which a refrigerant circulation line 9 is connected to circulate refrigerant that is discharged from a cooling device (not shown).

As described above, the outer rotor superconductor journal bearing of the present invention enhances a fixing force in an axial direction and a radial direction, prevents a superconductor from being damaged due to a different thermal expansion between the superconductor and a cryostat when cooled, and is easier for assembling and repair and maintenance.

As described above, although the exemplary embodiments of the invention have been described, the invention is not limited thereto. Therefore, it would be appreciated by those skilled in the art that various modifications and changes of the invention can be made without departing from the scope and spirit of the invention, the scope of which is defined in the appended claims and their equivalents.

What is claimed is:

1. An outer rotor superconductor journal bearing comprising:
    a rotor in which a solid of revolution magnet is magnetized in an axis direction in an inner portion of an inner circumference thereof; and
    a stator constituting a cryostat in the shape of a cylinder in which a plurality of superconductors that are tightly attracted by magnetic force to an inner circumference of the rotor is mounted in an outer circumference of the cryostat;
    wherein the cryostat comprises the superconductor in any one of the sides of the rounded outer circumference thereof, a module base in which the superconductors are mounted, and a fixing plate supporting the upper and lower surfaces of the superconductors so that the superconductors are spaced apart from each other by a predetermined gap between the upper and lower surfaces of the plurality of superconductors, and an inner material of the fixing plate is weaker than the superconductors in terms of the strength so that the superconductors are prevented from being damaged by a cooling contraction of the modules.

2. The outer rotor superconductor journal bearing of claim 1, wherein the surface shape of the cryostat corresponds to the surface shape of the module base and both are adhered to each other so that an area in which heat is conducted is maximized.

3. The outer rotor superconductor journal bearing of claim 1, wherein the upper and lower surfaces of the superconductors are in the shape of an upward inclined taper from a front portion to a rear portion, and are fixed in an axial direction and a radial direction by the fixing plate.

4. The outer rotor superconductor journal bearing of claim 1, wherein the fixing plate is also in the shape of an upward inclined taper from a front portion to a rear portion in order to correspond to the upper and lower surfaces of the superconductors.

* * * * *